(12) United States Patent
Hosono et al.

(10) Patent No.: US 10,124,319 B2
(45) Date of Patent: Nov. 13, 2018

(54) METHOD FOR PRODUCING CONDUCTIVE MAYENITE COMPOUND POWDER HAVING LARGE SPECIFIC SURFACE AREA

(71) Applicants: TOKYO INSTITUTE OF TECHNOLOGY, Tokyo (JP); JAPAN SCIENCE AND TECHNOLOGY AGENCY, Kawaguchi-shi, Saitama (JP)

(72) Inventors: Hideo Hosono, Tokyo (JP); Michikazu Hara, Tokyo (JP); Yasunori Inoue, Tokyo (JP); Masaaki Kitano, Tokyo (JP); Fumitaka Hayashi, Tokyo (JP); Toshiharu Yokoyama, Tokyo (JP); Satoru Matsuishi, Tokyo (JP); Yoshitake Toda, Tokyo (JP)

(73) Assignees: TOKYO INSTITUTE OF TECHNOLOGY, Tokyo (JP); JAPAN SCIENCE AND TECHNOLOGY AGENCY, Saitama (JP)

( * ) Notice: Subject to any disclaimer, the term of this patent is extended or adjusted under 35 U.S.C. 154(b) by 0 days.

(21) Appl. No.: 15/383,412

(22) Filed: Dec. 19, 2016

(65) Prior Publication Data
US 2017/0095793 A1    Apr. 6, 2017

Related U.S. Application Data

(62) Division of application No. 14/423,303, filed as application No. PCT/JP2013/072163 on Aug. 20, 2013, now Pat. No. 9,573,822.

(30) Foreign Application Priority Data

Aug. 30, 2012    (JP) ................................ 2012-189371

(51) Int. Cl.
| | | |
|---|---|---|
| *B01J 21/00* | (2006.01) | |
| *B01J 21/16* | (2006.01) | |
| *C01C 1/04* | (2006.01) | |
| *C01F 7/16* | (2006.01) | |
| *B01J 37/08* | (2006.01) | |
| *B01J 37/16* | (2006.01) | |
| *B01J 23/58* | (2006.01) | |
| *B01J 23/02* | (2006.01) | |
| *B01J 35/00* | (2006.01) | |
| *B01J 37/02* | (2006.01) | |
| *B01J 37/04* | (2006.01) | |
| *C01F 7/02* | (2006.01) | |
| *B01J 37/10* | (2006.01) | |

(Continued)

(52) U.S. Cl.
CPC ............... *B01J 21/16* (2013.01); *B01J 23/02* (2013.01); *B01J 23/462* (2013.01); *B01J 23/58* (2013.01); *B01J 35/0006* (2013.01); *B01J 35/0033* (2013.01); *B01J 35/026* (2013.01); *B01J 35/1009* (2013.01); *B01J 37/0201* (2013.01); *B01J 37/04* (2013.01); *B01J 37/08* (2013.01); *B01J 37/10* (2013.01); *B01J 37/16* (2013.01); *B01J 37/18* (2013.01); *C01B 33/26* (2013.01); *C01C 1/0411* (2013.01); *C01F 7/02* (2013.01); *C01F 7/164* (2013.01); *B01J 35/1014* (2013.01); *B01J 37/082* (2013.01); *B01J 37/347* (2013.01); *C01P 2006/12* (2013.01); *C01P 2006/40* (2013.01); *Y02P 20/52* (2015.11); *Y10T 428/2982* (2015.01)

(58) Field of Classification Search
CPC .. C01C 1/0411; B01J 35/1004–35/1028; B01J 35/0006; B01J 35/002; B01J 35/0033; B01J 23/02; B01J 21/04
USPC ......... 502/240–263, 341, 439; 423/359–363, 423/600; 264/235; 428/402
See application file for complete search history.

(56) References Cited

U.S. PATENT DOCUMENTS

| | | |
|---|---|---|
| 4,361,500 A | 11/1982 | Mathe et al. |
| 6,696,614 B2 | 2/2004 | Pollesel et al. |

(Continued)

FOREIGN PATENT DOCUMENTS

| | | |
|---|---|---|
| CN | 102307812 A | 1/2012 |
| EP | 1 650 164 A1 | 4/2006 |

(Continued)

OTHER PUBLICATIONS

International Search Report dated Oct. 8, 2013, issued in corresponding application No. PCT/JP2013/072163.

(Continued)

*Primary Examiner* — Steven J Bos
(74) *Attorney, Agent, or Firm* — Westerman, Hattori, Daniels & Adrian, LLP

(57) ABSTRACT

If a conductive mayenite compound having a large specific surface area is obtained, the usefulness thereof in respective applications is remarkably increased. A conductive mayenite compound powder having a conduction electron density of $10^{15}$ cm$^{-3}$ or more and a specific surface area of 5 m$^2$g$^{-1}$ or more is produced by: the following steps: (1) forming a precursor powder by subjecting a mixture of a starting material powder and water to a hydrothermal treatment; (2) forming a mayenite compound powder by heating and dehydrating the precursor powder; (3) forming an activated mayenite compound powder by heating the compound powder in an inert gas atmosphere or in a vacuum; and (4) injecting electrons into the mayenite compound through a reduction treatment by mixing the activated mayenite compound powder with a reducing agent.

10 Claims, No Drawings

(51) Int. Cl.
  *B01J 37/18* (2006.01)
  *B01J 23/46* (2006.01)
  *B01J 35/02* (2006.01)
  *B01J 35/10* (2006.01)
  *C01B 33/26* (2006.01)
  *B01J 37/34* (2006.01)

(56) References Cited

U.S. PATENT DOCUMENTS

| | | | | |
|---|---|---|---|---|
| 9,150,423 | B2* | 10/2015 | Hosono | B01J 35/002 |
| 2006/0276326 | A1* | 12/2006 | Hosono | C01F 7/164 |
| | | | | 501/153 |
| 2009/0075811 | A1* | 3/2009 | Namba | C04B 35/44 |
| | | | | 501/153 |
| 2009/0148369 | A1 | 6/2009 | Mori | |
| 2011/0155970 | A1* | 6/2011 | Ito | C01F 7/16 |
| | | | | 252/519.14 |
| 2011/0182803 | A1 | 7/2011 | Ito et al. | |
| 2011/0278509 | A1 | 11/2011 | Ito et al. | |
| 2013/0183224 | A1 | 7/2013 | Hosono et al. | |

FOREIGN PATENT DOCUMENTS

| | | | |
|---|---|---|---|
| EP | 1 717 217 A1 | | 11/2006 |
| EP | 1 897 853 A1 | | 3/2008 |
| EP | 1 900 689 A1 | | 3/2008 |
| EP | 1 961 702 A1 | | 8/2008 |
| EP | 2345624 A1 | | 7/2011 |
| EP | 2 472 560 A1 | | 7/2012 |
| JP | 2003-190787 | * | 7/2003 |
| JP | 2004-099430 A | | 4/2004 |
| JP | 2004-238222 | * | 8/2004 |
| JP | 2004-238222 A | | 8/2004 |
| JP | 2006-083009 A | | 3/2006 |
| JP | 2007-083126 A | | 4/2007 |
| JP | 2009-107858 A | | 5/2009 |
| JP | 2009-203126 A | | 9/2009 |
| JP | 2010-132467 A | | 6/2010 |
| JP | 2012-025636 A | | 2/2012 |
| JP | 2012-082081 A | | 4/2012 |
| JP | 2012-126618 A | | 7/2012 |
| RU | 2 459 781 C2 | | 8/2012 |
| WO | 2005/000741 A1 | | 1/2005 |
| WO | 2005/077859 A1 | | 8/2005 |
| WO | 2006/112455 A1 | | 10/2006 |
| WO | 2006/129674 A1 | | 12/2006 |
| WO | 2006/129675 A1 | | 12/2006 |
| WO | 2007/060890 A1 | | 5/2007 |
| WO | 2010/095552 A1 | | 8/2010 |
| WO | 2011/024821 A1 | | 3/2011 |
| WO | 2012/077658 A1 | | 6/2012 |

OTHER PUBLICATIONS

Hans Bartl, et al., "Zur Struktur des 12CaO—7Al2O3", N. Jahrbuch F. Mineralogie. Monatshefte, 1970, pp. 547-552.
Matsuishi, et al., "High-Density Electron Anions in a Nanoporous Single Crystal: [Ca24Al28O64]4+(4e−)", Science, Aug. 1, 2003, vol. 301, pp. 626-629.
Matsuishi, et al., "Direct Synthesis of Powdery Inorganic Electride [Ca24Al28O64]4+(e−)4 and Determination of Oxygen Stoichiometry", Chemistry of Materials Communication, 2009, vol. 21, pp. 2589-2591.
Gong, et al., "Synthesis and characteristics of the C12A7-O-nanoparticles by citric acid sol-gel combustion method", Materials Letters, 2010, vol. 64, pp. 1322-1324.
Li, et al., "Synthesis of higher surface area mayenite by hydrothermal method", Materials Research Bulletin, 2011, vol. 46, pp. 1307-1310.
Hayashi, et al., "Thermodynamics and Kinetics of Hydroxide Ion Formation in 12CaO—7Al2O3", J. Phys. Chem. B, 2005, Vo.109, pp. 11900-11906.
Extended European Search Report dated May 13, 2016, issued in counterpart European Application No. 13833435.4. (9 pages).
Office Action dated May 10, 2017, issued in counterpart Chinese Application No. 201610637803.7, with partial English translation. (8 pages).
Notice of Allowance dated Oct. 13, 2016, issued in U.S. Appl. No. 14/423,303 (10 pages).
Office Action dated Aug. 1, 2017, issued in counterpart Russian Application No. 2015111257, with English transaltion. (16 pages).
Katsuro Hayashi et al., "Light-induced conversion of an insulating refractory oxide into a persistent electronic conductor" Nature vol. 419, Oct. 3, 2002, pp. 462-465.
Young Mok Cho et al., "Effects of rapid thermal annealing on the ferromagnetic properties of sputtered Zn1-x (Co0.5Fe0.5)xO thin films", Applied Physics Letters, vol. 80, No. 18, May 6, 2002.
Office Action dated Sep. 11, 2018, issued in Indian application No. 1173/CHENP/2015, with English translation. (6 pages).

* cited by examiner

METHOD FOR PRODUCING CONDUCTIVE MAYENITE COMPOUND POWDER HAVING LARGE SPECIFIC SURFACE AREA

CROSS-REFERENCE TO RELATED APPLICATION

This application is a Divisional of U.S. patent application Ser. No. 14/423,303, filed on Feb. 23, 2015, which is a national stage application filed under 35 USC § 371 of International Application No. PCT/JP2013/072163, filed Aug. 20, 2013, and which is based on prior Japanese priority application No. 2012-189371 filed on Aug. 30, 2012, the entire contents of which are hereby incorporated by reference.

TECHNICAL FIELD

The present invention relates to a method for producing a conductive mayenite compound powder that is useful as electronic materials having electrical conduction properties, catalyst materials, etc. and has a large specific surface area.

BACKGROUND ART

Among calcium aluminosilicates containing CaO, $Al_2O_3$, and $SiO_2$ as components, there are substances whose mineral name is called mayenite. Compounds having the same type of crystal structure as mayenite are referred to as "mayenite compounds". Mayenite compounds have a typical composition represented by $12CaO \cdot 7Al_2O_3$ (hereinafter represented by "C12A7"). It has been reported that a C12A7 crystal has a specific crystal structure in which two oxygen ions out of 66 oxygen ions in a unit cell including two molecules are clathrated in the form of "free oxygen" in a space of a cage formed by the crystal skeleton (NPL 1).

Since 2003, the inventors of the present invention disclosed that free oxygen ions included in mayenite compounds can be substituted with various types of anions. In particular, by maintaining C12A7 in a strong reducing atmosphere, all free oxygen ions can be substituted with electrons. C12A7 whose free oxygen ions are substituted with electrons can be represented by a chemical formula of $[Ca_{24}Al_{28}O_{64}]^{4+}(e^-)_4$ (hereinafter represented by "C12A7:$e^-$"). Substances in which anions are substituted with electrons in this manner are referred to as "electrides", and electrides have a feature of exhibiting good electron conductivity (NPL 2).

The inventors of the present invention found that C12A7:$e^-$ including conduction electrons at a concentration of $1 \times 10^{19}$ $cm^{-3}$ or more and a compound having the same type of crystal structure as C12A7 are obtained by (A) a method that includes maintaining an isostatically pressed compact of a single crystal or a fine powder of C12A7 in an alkali metal vapor or an alkaline earth metal vapor in the range of 600° C. to 800° C., (B) a method that includes performing ion-implantation of an inert ion into a C12A7 thin film, or (C) a method that includes melting an isostatically pressed compact of a fine powder of C12A7 in a reducing atmosphere, and directly solidifying the melt (PTL 1).

The inventors of the present invention have filed patents for inventions relating to a method in which a raw material substance of a good conductive mayenite compound is melted, and the resulting melt is maintained in an atmosphere with a low oxygen partial pressure and then subjected to cooling solidification (PTL 2); and a method in which a reducing agent such as carbon, Al, or Ti is added to a powder obtained by pulverizing a sintered product prepared by maintaining a raw material powder at a high temperature to sinter the raw material powder in a solid-phase reaction, a press-molded body of the powder, or a sintered body obtained by sintering the molded body in the range of 1,200° C. to 1,350° C., and the resulting mixture is heat-treated in the range of 600° C. to 1,415° C. to provide conductivity (that is, to substitute free oxygen ions with electrons) (PTL 3 and PTL 4). Furthermore, the inventors of the present invention successfully obtained C12A7:$e^-$ that exhibits a metallic electrical conduction property by annealing a C12A7 single crystal in a metallic titanium (Ti) vapor, and have filed a patent for inventions relating to a method for producing the C12A7:$e^-$ and use of the C12A7:$e^-$ as an electron emission material (PTL 5).

Patents of inventions relating to the following methods for producing a conductive mayenite compound have been filed. Examples of the methods include a method in which a compound oxide film represented by $12Ca_{1-x}Sr_xO \cdot 7Al_2O_3$ (x=0 to 1), the compound oxide film being obtained by firing a raw material of a non-aqueous solution by heating in the range of 500° C. to 1,500° C., is heated in the range of 700° C. to 1,500° C. to perform a reduction treatment (PTL 6); a method in which a mixed raw material is heated in an inert atmosphere with an oxygen partial pressure of 1,000 Pa or less or in a vacuum atmosphere in the range of 1,200° C. to 1,415° C. (PTL 7); a method in which a mixture of a raw material and a reducing agent such as metallic Al or metallic Ca is sintered in the range of 1,200° C. to 1,415° C. or melted in the range of 1,415° C. to 1,600° C. (PTL 8); and a method in which a mayenite compound powder is heated in the range of 300° C. to 1,200° C. to form a sintered body having open pores, and the sintered body is heated in a reducing atmosphere in the range of 1,200° C. to 1,450° C. (PTL 9).

Regarding C12A7:$e^-$, which has a metallic electrical conduction property, a powder of C12A7:$e^-$ can be directly synthesized by mixing $CaCO_3$ with $Al_2O_3$ at a ratio of 11:7, heating the mixture at 1,300° C., and heating the resulting product in a metallic Ca vapor atmosphere (NPL 3). Conductive mayenite compounds are used in electron emitters, field emission display devices, cold cathode fluorescent tubes, flat lighting devices, electron emission materials (PTL 10), electrodes for discharge lamps (PTL 11), and the like.

Furthermore, a patent for an invention relating to a mayenite compound in which some Al atoms in C12A7, which is a conductive mayenite compound, are substituted with Ga or In atoms has been filed. This mayenite compound is suitable for electrode materials that require a high-temperature heat treatment, for example, a plasma display panel (PDP) protective film material, a charge injection material in an organic electroluminescent (EL) device, and the like (PTL 12).

The inventors of the present invention have filed patents for inventions relating to a catalyst of an ammonia synthesis reaction, the catalyst including a conductive mayenite compound and a metal such as Ru or Fe supported on the conductive mayenite compound (PTL 13) and a method for reducing carbon dioxide to carbon monoxide by using a conductive mayenite compound (PTL 14). Furthermore, even C12A7 that does not have electrical conductivity has applications as a catalyst or a catalyst support. For example, it is known that a catalyst obtained by spray-drying a complex solution of a raw material and subsequently calcining the resulting product in the range of 1,300° C. to 1,400° C. for two hours or more is used as a catalyst for steam cracking reaction for producing a soft olefin (PTL 15).

Recently, methods for producing a support having a large specific surface area, the methods including the steps of synthesizing a precursor by a hydrothermal method or a sol-gel method and subsequently firing the precursor, have been proposed (NPL 4 and NPL 5).

It has been reported that when C12A7 is left to stand in an atmosphere containing moisture, hydroxide ions ($OH^-$) are clathrated in the cage and are not easily removed even at high temperatures (NPL 6).

CITATION LIST

Patent Literature

PTL 1: WO2005/000741
PTL 2: WO2005/077859
PTL 3: WO2006/129674
PTL 4: WO2006/129675
PTL 5: WO2007/060890
PTL 6: Japanese Unexamined Patent Application Publication No. 2009-107858
PTL 7: Japanese Unexamined Patent Application Publication No. 2010-132467
PTL 8: Japanese Unexamined Patent Application Publication No. 2012-082081
PTL 9: Japanese Unexamined Patent Application Publication No. 2012-126618
PTL 10: WO2006/112455
PTL 11: WO2011/024821
PTL 12: Japanese Unexamined Patent Application Publication No. 2009-203126
PTL 13: WO2012/077658
PTL 14: Japanese Unexamined Patent Application Publication No. 2012-025636
PTL 15: U.S. Pat. No. 6,696,614 specification Non Patent Literature NPL 1: Von Hans Bartl and Thomas Scheller, "N. Jahrbuch F. Mineralogie. Monatshefte", 35, 547-552, (1970)
NPL 2: S. Matsuishi, Y. Toda, M. Miyakawa, K. Hayashi, T. Kamiya, M. Hirano, I. Tanaka, and H. Hosono, "Science", 301, 626-629, (2003)
NPL 3: S. Matsuishi, T. Nomura, M. Hirano, K. Kodama, S. Shamoto, and H. Hosono, "Chemistry of Materials", 21, 2589-2591, (2009)
NPL 4: L. Gong, Z. Lin, S. Ning, J. Sun, J. Shen, Y. Torimoto, and Q. Li, "Material Letters", 64, 1322-1324, (2010)
NPL 5: C. Li, D. Hirabayashi and K. Suzuki, "Materials Research Bulletin", 46, 1307-1310, (2011)
NPL 6: K. Hayashi, M. Hirano, and H. Hosono, "J. Phys. Chem. B", 109, 11900-11906, (2005)

SUMMARY OF INVENTION

Technical Problem

Conductive mayenite compounds are expected to be applied to cold electron emitters, conductors, electron injection electrodes of organic EL, thermoelectric conversion materials, thermionic power generation materials, reducing agents, oxidizing agents, catalysts, and the like.

In known methods for producing a conductive mayenite compound containing $10^{15}$ $cm^{-3}$ or more of conduction electrons, a synthesis step at a high temperature is necessary, for example, as in a method in which a raw material mixed with a reducing agent is fired at a high temperature of 1,200° C. or higher and subjected to a reduction treatment at the same time (PTL 8) or in a method in which a reduction treatment is performed for a mayenite compound synthesized by firing at a high temperature of 1,200° C. or higher (PTL 8).

Accordingly, even when a raw material having a large specific surface area is used, sintering of particles occurs in the steps of producing and crystallizing a mayenite compound, and consequently, particles having a small surface area or a block is formed. Therefore, a mayenite compound having a specific surface area of at most about 2 $m^2g^{-1}$ is merely obtained. Accordingly, a mayenite compound having a large specific surface area and containing $10^{15}$ $cm^{-3}$ or more of conduction electrons and means for producing such a mayenite compound are not known to date. If a conductive mayenite compound having a specific surface area of 5 $m^2g^{-1}$ or more is obtained, it is believed that the usefulness of the conductive mayenite compound in the above applications remarkably increases.

Solution to Problem

As a result of intensive studies conducted in order to achieve the above object, the inventors of the present invention found a method for producing a conductive mayenite compound powder having a large specific surface area, and resulted in the completion of the present invention.

Specifically, in existing methods, it is necessary that a mayenite compound be subjected to an electron injection operation by a reduction treatment at a high temperature of 1,200° C. or higher. Accordingly, even when a raw material powder having a large specific surface area is used, a powder having a large specific surface area is not obtained because the raw material powder is sintered by the high-temperature treatment. However, the inventors of the present invention found means for performing an electron injection operation at a low temperature of 1,100° C. or lower and realized the production of a conductive mayenite compound powder having a specific surface area of 5 $m^2g^{-1}$ or more.

The present invention provides a method for producing a conductive mayenite compound powder having a conduction electron concentration of $10^{15}$ $cm^{-3}$ or more and a specific surface area of 5 $m^2g^{-1}$ or more, the method including at least (1) a step of forming a precursor powder of a mayenite compound by subjecting a mixture of a raw material powder of the mayenite compound and water to a hydrothermal treatment, (2) a step of forming a mayenite compound powder by dehydrating the precursor powder by heating, (3) a step of forming an activated mayenite compound powder by heating the mayenite compound powder in an inert gas atmosphere or in a vacuum in a temperature range of 400° C. to 1,000° C. for three hours or more, and (4) a step of injecting electrons into the mayenite compound by mixing the activated mayenite compound powder with a reducing agent and heating the resulting mixture in a temperature range of 400° C. to 1,100° C. to conduct a reduction treatment.

In addition, the present invention provides the method for producing a conductive mayenite compound powder, the method further including, after the step (4), (5) a step of repeating a rapid thermal annealing process (RTA process) including increasing a temperature at a rate of 30 to 60° C. $min^{-1}$ and holding under heating in a range of 900° C. to 1,100° C.

In the method of the present invention, the mayenite compound is typically 12CaO.7Al$_2$O$_3$. The reducing agent is preferably Ca or CaH$_2$.

The reasons why a conductive mayenite compound powder having a specific surface area of 5 m$^2$g$^{-1}$ or more could be obtained are the following two points. First, by using a hydrothermal synthesis method, raw materials of the mayenite compound, for example, a Ca source and an Al source in the case of C12A7, are uniformly and satisfactorily mixed, and a hydrated oxide functioning as a precursor of crystals can be produced at a low temperature. By dehydrating the precursor by heating, a mayenite compound can be obtained at a temperature lower than that in a solid-phase synthesis. As a result, the mayenite compound is obtained in the form of fine particles on the submicron order, and thus has a large specific surface area. However, in a method similar to an existing method, even when a reducing agent having a high reduction performance is used, the reducing agent does not function and it is difficult to inject electrons into such fine particles. By subjecting a mayenite compound powder having such a large specific surface area to an evacuation treatment in the range of 800° C. to 1,000° C., adsorbed water, a surface hydroxy group, OH$^-$ in the cage, and the like can be sufficiently removed. Thus, the reducing agent can be used without deactivation. Furthermore, with the use of CaH$_2$, which has a high reduction performance, a conductive mayenite compound powder can be obtained by conducting a reduction treatment at a low temperature (700° C. to 800° C.)

Secondly, in the case where a rapid thermal annealing process (hereinafter referred to as "RTA process") is used in further reducing a powder surface, a part of which is insulated after the reduction treatment, the temperature can be increased at a high speed and thus the reduction treatment can be finished before sintering and aggregation of particles occur. Accordingly, even when the reduction by heating is performed at a relatively high temperature (900° C. to 1,100° C.), a conductive mayenite compound having a large specific surface area is obtained.

Furthermore, the present invention provides a method for producing a supported metal catalyst, the method including, by using an impregnation method, a physical mixing method, a thermal decomposition method, a liquid-phase method, a sputtering method, or a vapor deposition method, allowing a metal catalyst to be supported on the conductive mayenite compound powder produced by the above method.

The supported metal component that can be used is not particularly limited, but may be any of Li, Na, K, Rb, and Cs selected from group 1A elements; Mg, Ca, Sr, and Ba selected from group 2A elements; Sc, Y, lanthanides, and actinides selected from group 3A elements; Ti, Zr, and Hf selected from group 4A elements; V, Nb, and Ta selected from group 5A elements; Cr, Mo, and W selected from group 6A elements; Mn, Tc, and Re selected from group 7A elements; Fe, Ru, and Os selected from group 8 elements; Co, Rh, and Ir selected from group 9 elements; Ni, Pd, and Pt selected from group 10 elements; Cu, Ag, and Au, selected from group 11 elements; Zn, Cd, and Hg selected from group 12 elements; B, Al, Ga, In, and Tl selected from group 13 elements; Si, Ge, Sn, and Pb selected from group 14 elements; As, Sb, and Bi selected from group 15 elements; and Se and Te selected from group 16 elements. These components may be used in combination.

The catalyst of the present invention can be used in various catalytic reactions such as oxidation, hydrogenation, isomerization, disproportionation, esterification, a condensation reaction, an acid-base reaction, and a polymerization reaction, but the use of the catalyst is not limited thereto. Among the above metal components, transition metal elements are used as homogeneous/heterogeneous catalysts in various synthesis reactions. In particular, group 6, 8, and 9 transition metals such as Fe, Ru, Os, Co, Rh, and Mo are suitable for catalysts used in the synthesis of ammonia by using a direct reaction of hydrogen and nitrogen.

For example, Mo W, Re, Fe, Co, Ru, Rh, and Os are known as transition metals having an ammonia synthesis activity, and the catalyst may be one obtained by modifying any of these components with an electron injection material such as an alkali metal or an alkaline earth metal. Alternatively, a combination of the above elements, a nitride of a group 8 or group 6B transition metal, or a Co/Mo compound nitride can be used as the catalyst.

In the case where a mayenite compound powder or porous body is used as a support, a catalyst is obtained by mixing a mayenite compound powder or porous body containing $1\times10^{15}$ cm$^{-3}$ or more of conduction electrons and obtained in the above step with a transition metal compound by an impregnation method or a physical mixing method, and then heating the resulting mixture to decompose the transition metal compound to a transition metal by reduction. Alternatively, for example, a transition metal compound may be deposited on a surface of the mayenite compound powder or porous body by a chemical vapor deposition (CVD) method, a sputtering method, or the like, and the transition metal compound may be thermally decomposed to deposit the transition metal.

Examples of the transition metal compound include, but are not particularly limited to, inorganic metal compounds and organometallic complexes that are easily thermally decomposed, such as triruthenium dodecacarbonyl [Ru$_3$(CO)$_{12}$], dichlorotetrakis(triphenylphosphine)ruthenium(II) [RuCl$_2$(PPh$_3$)$_4$], dichlorotris(triphenylphosphine)ruthenium(II) [RuCl$_2$(PPh$_3$)$_3$], tris(acetylacetonato)ruthenium(III) [Ru(acac)$_3$], ruthenocene [Ru(C$_5$H$_5$)], ruthenium chloride [RuCl$_3$], pentacarbonyliron [Fe(CO)$_5$], iron nonacarbonyl [Fe$_2$(CO)$_9$], tetracarbonyl iron iodide [Fe(CO)$_4$I$_2$], iron chloride [FeCl$_3$], ferrocene [Fe(C$_5$H$_5$)$_2$], tris(acetylacetonato)iron(III) [Fe(acac)$_3$], dodecacarbonyltriiron [Fe$_3$(CO)$_{12}$], cobalt chloride [CoCl$_3$], tris(acetylacetonato)cobalt(III) [Co(acac)$_3$], cobalt(II) acetylacetonato [Co(acac)$_2$], cobaltoctacarbonyl [Co$_2$(CO)$_8$], cobaltocene [Co(C$_5$H$_{52}$), triosmiumdodecacarbonyl [Os$_3$(CO)$_{12}$], and molybdenum hexacarbonyl [Mo(CO)$_6$].

The following steps can be employed as the impregnation method. For example, a carbon powder is dispersed in a transition metal compound solution (for example, a hexane solution of a Ru carbonyl complex) and stirred. In this case, the amount of the transition metal compound is about 0.01% to 40% by weight, preferably about 0.02% to 30% by weight, and more preferably about 0.05% to 20% by weight relative to a support powder. Subsequently, the resulting dispersion is heated in an inert gas stream such as nitrogen, argon, or helium or in a vacuum at 50° C. to 200° C. for 30 minutes to 5 hours to evaporate the solvent, and thus the powder is dried. Next, the resulting catalyst precursor composed of the dry transition metal compound is reduced. Through the above steps, a supported metal catalyst that supports, on the support powder, a transition metal in the form of fine particles having a particle size of several nanometers to several hundred nanometers is obtained.

The amount of transition metal is 0.01% to 30% by weight, preferably 0.02% to 20% by weight, and more preferably 0.05% to 10% by weight relative to the support powder. The support powder supporting the transition metal thereon clathrates electrons to the same degree as that in the initial state, even after a supporting step, and has a small work function in terms of support. Accordingly, the support powder has a high ability to donate electrons to a transition metal and significantly accelerates activation of nitrogen and hydrogen on the transition metal. As a result, the support powder functions as a high-performance ammonia synthesis catalyst.

The catalyst of the present invention functions as a high-performance ammonia synthesis catalyst, even without using an alkali metal, an alkaline earth metal, or a compound thereof as an accelerator compound. However, these accelerator compounds may be used according to need.

The supported metal catalyst may be used in the form of a molded body by using a common molding technique. Specifically, examples of the shape of the supported metal catalyst include a granular shape, a spherical shape, a tablet shape, a ring shape, a macaroni shape, a clover-leaf shape, a die shape, and a honey-comb shape. Alternatively, an appropriate base may be coated with the supported metal catalyst and used.

The present invention further provides a method for synthesizing ammonia, the method including using the supported metal catalyst produced by the above method in a synthesis reaction in which nitrogen gas ($N_2$) and hydrogen gas ($H_2$) are allowed to react with each other to produce ammonia gas ($NH_3$).

Advantageous Effects of Invention

According to the method of the present invention, a conductive mayenite compound powder which is useful as electronic material components such as a PDP protective film material and an electrode material that requires a high-temperature heat treatment or catalyst raw materials and which has a large specific surface area can be provided by using an existing electron injection method with a reducing agent.

Description of Embodiments

A production method of the present invention will now be described in detail.

Crystals of a mayenite compound are formed by three-dimensionally connecting cage-shaped structures (cages) each having an inner diameter of about 0.4 nm while sharing wall surfaces thereof. In general, anions such as $O^{2-}$ are included inside the cages of a mayenite compound. However, these anions can be substituted with conduction electrons by providing a chemical treatment. The conduction electron concentration in the mayenite compound is increased by increasing the annealing time.

In mayenite compounds, electrons that substitute oxide ions ($O^{2-}$) included in the structures thereof function as conduction electrons. In the case of C12A7, the mayenite compound is represented by a composition formula $([Ca_{24}Al_{28}O_{64}]^{4+}(O^{2-})_{2-x}(e^-)_{2x})$ (where $0<x<2$). Furthermore, the conduction electron concentration is made to $1\times10^{15}$ $cm^{-3}$ or more by substituting the oxide ions with electrons. Accordingly, mayenite compounds including conduction electrons can be referred to as "conductive mayenite compounds". In the case of C12A7:$e^-$, a theoretical maximum concentration of conduction electrons is $2.3\times10^{21}$ $cm^{-3}$. A mayenite compound having a conduction electron concentration equal to the theoretical value can be obtained by the method described above.

Conductive mayenite compounds generate light absorption at 2.8 eV and 0.4 eV. An electron density is determined by measuring an optical absorption coefficient of the light absorption. In the case of a powder sample, the electron density is easily determined by using a diffuse reflectance method. Alternatively, the electron density in cages can be measured by using electron spin resonance (ESR) because electrons in the cages are spin-active. Furthermore, when a mayenite compound including conduction electrons is dissolved in a solution containing iodine, the mayenite compound reduces iodine. By using this action, the electron density in cages can be measured by a redox titration.

In the present invention, the term "specific surface area" refers to a value measured on the basis of an adsorption isotherm of nitrogen molecules at a liquid nitrogen temperature ($-196°$ C.). The specific surface areas of synthesized conductive mayenite compounds were estimated by applying the BET (Brunauer, Emmett, and Teller) formula in the range of 0.05 to 0.3 of an equilibrium pressure ($P/P_0$; where P represents a partial pressure (Pa) of an adsorption gas that is in an equilibrium state with a sample surface at $-196°$ C., and $P_0$ represents a vapor pressure (Pa) of the adsorption gas) of the adsorption isotherm.

<Synthesis of Mayenite Compound>

In the method of the present invention, a mayenite compound used as a staring material of a target compound is more preferably in the form of a fine powder (primary particle size: 100 nm or less) or a bulk porous body having a porous structure. When the mayenite compound is in the form of fine particles, the surface area per gram increases and the gap between the particles is in the mesopore range (2 nm or more and 100 nm or less). A hydroxide serving as a precursor of the mayenite compound can be obtained by a hydrothermal treatment method.

<Method for Synthesizing Mayenite Compound by Using Hydrothermal Treatment>

A hydrothermal synthesis method has been studied for a long time as a method for synthesizing inorganic oxide fine particles having a good crystal quality. A precursor compound can be prepared by charging a solvent such as water or an alcohol and a raw material in a pressure-resistant container, and heating the resulting mixture at a temperature equal to or higher than a boiling point of the solvent for several hours to several days.

$Ca_3Al_2(OH)_{12}$, which is a hydroxide serving as a precursor of a mayenite compound C12A7, can be prepared by mixing water, calcium hydroxide, and aluminum hydroxide in a stoichiometric composition, and heating the resulting mixture, for example, at 150° C. for about six hours. The prepared precursor is dehydrated by heating in air in a range of about 400° C. to 1,000° C. Thus, a mayenite compound powder C12A7 having a large specific surface area (about 20 to 60 $m^2g^{-1}$) is obtained.

<Pretreatment of Mayenite Compound>

The mayenite compound powder having a large specific surface area and synthesized by way of the hydrothermal treatment method retains hydroxy groups that are strongly bonded on a surface of the powder or in a cage skeleton. In a step of allowing conduction electrons to be included, a reducing agent is consumed by reacting with the hydroxy groups ($2CaH_2+2OH\rightarrow2CaO+3H_2$). Therefore, it is necessary that the surface of the powder or the inside of the cage skeleton be activated by removing the hydroxy groups as much as possible in a pretreatment step before the electron injection step. The specific surface area after the pretreatment is decreased with an increase in the temperature of the pretreatment. In a temperature range of 400° C. to 1,000° C., for example, the specific surface area is changed from 60 $m^2g^{-1}$ to 6 $m^2g^{-1}$.

Regarding the pretreatment method, heating is preferably performed at a temperature in the range of 400° C. to 1,100° C. in an inert gas atmosphere or in a vacuum. The heating temperature is preferably in the range of 700° C. to 1,000° C. and more preferably 800° C. to 900° C. When the heating temperature is lower than 400° C., although a powder having a large specific surface area is obtained, a high conduction electron concentration cannot be obtained because, in the reduction treatment step, a reducing agent is consumed by a hydroxy group retained by the powder. On the other hand, when the heating temperature exceeds 1,100° C., although a high conduction electron concentration is obtained, a mayenite compound powder having a large specific surface area cannot be obtained because sintering of the powder proceeds. In order to sufficiently perform the activation, the heating is preferably conducted for three hours or more.

<Step of Allowing Conduction Electron to be Included in Mayenite Compound by Reduction Treatment>

In the case where a mayenite compound powder including conduction electrons is prepared, a raw material powder of the mayenite compound having a chemical equivalent composition is heated in a reducing atmosphere in the range of 400° C. to 1,100° C. The heating temperature is preferably in the range of 600° C. to 900° C., and more preferably in the range of 700° C. to 800° C. When the heating temperature is lower than 400° C., a reaction between an oxygen ion and a reducing agent in a cage does not sufficiently proceed, and a high conduction electron concentration cannot be obtained. On the other hand, at a heating temperature exceeding 1,100° C., although a high conduction electron concentration can be obtained, the specific surface area is decreased by sintering. The treatment time is preferably three hours or more in order to sufficiently diffuse oxygen ions and exchange the oxygen ions with conduction electrons.

Any reducing agent may be used as long as the reducing agent reacts with an oxygen ion in a cage in the above heating temperature range. Examples of the reducing agent that can be used include alkali metals such as Na and Li; alkaline earth metals such as Mg, Ca, $CaH_2$; and hydrides thereof. Calcium hydride ($CaH_2$) becomes CaO after reduction and remains as an impurity, and thus the effective surface area of the conductive mayenite compound may be decreased. The higher the treatment temperature during the step of allowing conduction electrons to be included, the smaller the specific surface area of the mayenite compound powder subjected to the step becomes. For example, in the case where a mayenite compound powder sample is prepared by conducting a pretreatment at 800° C., and a reduction treatment of the sample is performed in a temperature range of 600° C. to 800° C., the specific surface area of the sample is changed, for example, from about 30 $m^2g^{-1}$ to about 20 $m^2g^{-1}$.

<RTA Process>

A part of a surface of the mayenite compound powder that has reacted with the reducing agent may be insulated as a result of being covered with, for example, calcium oxide. An RTA process can be used as a process for reducing the powder surface that has been insulated. The RTA process is an abbreviation for a rapid thermal annealing process, and is known as a method for improving crystal qualities of semiconductors. In an existing method for heating the surface of a powder, the temperature-increasing rate is as low as about 5 to 10° C. $min^{-1}$, and a decrease in the surface area due to sintering of particles cannot be prevented. In contrast, by using the RTA process, the crystal quality of the surface of an electride can be improved without decreasing the surface area, and an electrical conduction property can be provided to the mayenite compound powder including the surface thereof. In the case where crystallization is performed by the RTA process, in an inert atmosphere, in a reducing atmosphere, or in a vacuum, the temperature is increased at a temperature-increasing rate of 30 to 60° C. $min^{-1}$, and the temperature is held as a heating temperature at 900° C. to 1,100° C. for 5 to 15 seconds. The step of increasing the temperature and the step of holding the temperature under heating are repeated two to five times. The holding temperature is preferably in the range of 950° C. to 1,100° C.

<Process for Producing Catalyst Including Conductive Mayenite Compound as Support>

A catalyst can be produced, using an impregnation method, a physical mixing method, a thermal decomposition method, a liquid-phase method, a sputtering method, or a vapor deposition method, by allowing a transition metal catalyst such as Ru to be supported on the conductive mayenite compound powder produced by the method described above. In the physical mixing method, a conductive mayenite compound powder and a transition metal compound powder are mixed in a solid phase by a physical mixing method, and the transition metal compound is then reduced by heating the resulting mixture in a reducing atmosphere such as a hydrogen atmosphere in a temperature range of 50° C. to 600° C. Thus, a supported metal catalyst is obtained. From the viewpoint of suppressing sintering of supported metal particles, before the reduction by heating, increasing a temperature and holding a temperature are preferably repeated several times in a vacuum.

The impregnation method includes a step of dispersing a conductive mayenite compound powder in a solvent solution of a transition metal compound, a step of forming a catalyst precursor composed of the transition metal compound that is dried by evaporating a solvent of the solvent solution, and a step of forming the metal catalyst by reducing the transition metal compound by heating in a reducing atmosphere.

The support powder supporting a transition metal thereon clathrates electrons to the same degree as that in the initial state, even after the supporting step, and has a small work function in terms of support. Accordingly, the support powder has a high ability to donate electrons to a transition metal. In addition, since the support has a large specific surface area, the support powder significantly accelerates activation of nitrogen and hydrogen on a transition metal. As a result, the support powder functions as an ammonia synthesis catalyst with a high performance as compared with the case where a conductive mayenite powder having a small specific surface area is used. By using a transition metal catalyst supported on the conductive mayenite compound powder by using any of these methods, ammonia can be synthesized by allowing nitrogen and hydrogen, which are raw materials, to react with each other on the catalyst in a reactor at a reaction temperature of 100° C. or higher and 600° C. or lower and at a reaction pressure of 10 kPa to 30 MPa.

EXAMPLE 1

<Synthesis of Mayenite Compound Powder>

Calcium hydroxide ($Ca(OH)_2$) and aluminum hydroxide ($Al(OH)_3$) were weighed so as to satisfy Ca:Al=12:14, and mixed. Distilled water was weighed so that the concentration of the resulting mixed powder became 10% by weight, and a total of 160 g was stirred and mixed in a planetary ball mill for four hours. The resulting mixed solution was charged in a pressure-resistant hermetically sealed container, and a heat treatment (hydrothermal treatment) was performed at 150° C. for six hours while stirring. The resulting precipitate was separated by filtration, dried, and then pulverized. Thus, about 20 g of a precursor powder of a mayenite compound $Ca_3Al_2(OH)_{12}$ was obtained. This precursor powder was dehydrated by heating in air at 600° C. for five hours to prepare a mayenite compound powder as a raw material with a large specific surface area. This raw material had a specific surface area of 60 $m^2g^{-1}$.

<Pretreatment>As a pretreatment, the powder was put in a silica glass tube, heated in a vacuum of $1\times10^{-4}$ Pa at 900° C. for five hours under evacuation, and taken out from the glass tube. The powder obtained at this stage had a specific surface area of about 30 $m^2g^{-1}$.

<Electron Injection by Reduction Treatment>

Subsequently, 0.4 g of $CaH_2$ serving as a reducing agent was added relative to 3 g of the powder after the pretreatment, and sufficiently mixed to prepare a mixture. A tantalum (Ta) tube was then filled with the mixture. The Ta tube filled with the mixture was placed in a silica glass tube, and heated in a vacuum of $1\times10^{-4}$ Pa at 700° C. for 15 hours. A conductive mayenite compound powder having a conduction electron concentration of $1.0\times10^{21}$ $cm^{-3}$ and a specific surface area of 17 $m^2g^{-1}$ was obtained.

COMPARATIVE EXAMPLE 1

<Synthesis of Mayenite Compound Powder>

A $CaCO_3$ powder and an $Al_2O_3$ powder were mixed so that a ratio of Ca to Al became 11:14. A total of 30 g was heated in an alumina crucible at 1,300° C. for six hours. The resulting powder was inserted in a silica glass tube, and heated in a vacuum of $1\times10^{-4}$ Pa at 1,100° C. for 15 hours to prepare a mayenite compound powder as a raw material. The powder obtained at this stage had a specific surface area of 1 $m^2g^{-1}$ or less.

<Electron Injection by Reduction Treatment>

Subsequently, 3 g of the powder prepared by the synthesis method described above was inserted into a silica glass tube together with 0.18 g of a metallic Ca powder, and heated at 700° C. for 15 hours, thereby generating a metallic Ca vapor atmosphere in the tube to allow the metallic Ca to react with the powder. The sample sealed in the tube in a vacuum state was taken out, and ground with a mortar. Subsequently, a silica glass tube is filled with the ground sample again, and sealed under evacuation. This silica glass tube was heated at 1,100° C. for two hours. Thus, a conductive mayenite compound powder C12A7:e⁻ (denoted by $C12A7e^{21}$) having a conduction electron concentration of $2\times10^{21}$ $cm^{-3}$ and a specific surface area of 1 $m^2g^{-1}$ was obtained.

EXAMPLE 2

A mayenite compound powder having a large specific surface area was synthesized under the same conditions as in Example 1 except that the pretreatment was conducted at 800° C. instead of the pretreatment temperature of the raw material of 900° C. in Example 1. The powder obtained at this stage had a specific surface area of 40 $m^2g^{-1}$.

<Electron Injection by Reduction Treatment>

A conductive mayenite compound powder was synthesized under the same conditions as in Example 1 except that the reduction treatment was conducted at 600° C. instead of the reduction treatment temperature of 700° C. in Example 1. The conduction electron concentration was $1.0\times10^{21}$ $cm^{-3}$, and the specific surface area was 31 $m^2g^{-1}$.

EXAMPLE 3

<Electron Injection by Reduction Treatment>

A conductive mayenite compound powder was synthesized under the same conditions as in Example 1 except that the reduction treatment was conducted at 600° C. instead of the reduction treatment temperature of 700° C. in Example 1. The conduction electron concentration was $0.8\times10^{21}$ $cm^{-3}$, and the specific surface area was 20 $m^2g^{-1}$.

EXAMPLE 4

<Pretreatment>

A mayenite compound powder having a large specific surface area was synthesized under the same conditions as in Example 1 except that the pretreatment was conducted at 800° C. instead of the pretreatment temperature of the raw material of 900° C. in Example 1. The specific surface area at this stage was 40 $m^2g^{-1}$.

<Electron Injection by Reduction Treatment>

A conductive mayenite compound powder was synthesized by conducting a reduction treatment under the same conditions as in Example 1. The conduction electron concentration was $1.0\times10^{21}$ $cm^{-3}$, and the specific surface area was 23 $m^2g^{-1}$.

EXAMPLE 5

<Pretreatment>

A mayenite compound powder having a large specific surface area was synthesized under the same conditions as in Example 1 except that the pretreatment was conducted at 800° C. instead of the pretreatment temperature of the raw material of 900° C. in Example 1. The specific surface area at this stage was 40 $m^2g^{-1}$.

<Electron Injection by Reduction Treatment>

A conductive mayenite compound powder was synthesized under the same conditions as in Example 1 except that the reduction treatment was conducted at 800° C. instead of the reduction treatment temperature of 700° C. in Example 1. The conduction electron concentration was $0.4\times10^{21}$ $cm^{-3}$, and the specific surface area was 10 $m^2g^{-1}$.

COMPARATIVE EXAMPLE 2

A mayenite compound powder was synthesized by the same method as in Example 1. However, the pretreatment of Example 1 was not performed, and the electron injection by the reduction treatment was also not performed. The conduction electron concentration was zero, and the specific surface area was 60 $m^2g^{-1}$.

EXAMPLE 6

<Pretreatment>

An electride was synthesized under the same conditions as in Example 1 except that the pretreatment was conducted at 1,000° C. instead of the pretreatment temperature of the raw material of 900° C. in Example 1. A conductive mayenite compound powder having a conduction electron concentration of $1.4\times10^{21}$ $cm^{-1}$ and a specific surface area of 6 $m^2g^{-1}$ was obtained.

EXAMPLE 7

<Synthesis of Mayenite Compound>

The $Ca_3Al_2(OH)_{12}$ prepared in Example 1 was dehydrated by heating at 800° C. for two hours in an oxygen stream. Thus, a mayenite compound powder was prepared as a raw material.

<Pretreatment>

As a pretreatment of this raw material, the powder was put in a silica glass tube, and heated in a vacuum of $1\times10^{-4}$ Pa at 800° C. for 20 hours under evacuation.

<Electron Injection by Reduction Treatment>

Calcium (Ca) metal was used as a reducing agent instead of $CaH_2$ in Example 1. To 2 g of the powder after the pretreatment, 0.12 g of Ca metal serving as a reducing agent was added. The resulting mixture was put in a silica glass tube, and was heated in a vacuum of $1\times10^{-4}$ Pa at 700° C. for 15 hours.

<RTA Process>

Furthermore, in order to activate the surface of the powder, a Tammann tube was filled with the powder and vacuum-sealed. Subsequently, an RTA process was conducted by repeating twice a step of increasing the temperature at a temperature-increasing rate of 45 ° C. $\min^{-1}$ and then holding the temperature at 950° C. for five seconds under heating. A conductive mayenite compound powder having a conduction electron concentration of $0.5\times10^{21}$ $cm^{-1}$ and a specific surface area of 19 $m^2g^{-1}$ was obtained.

EXAMPLE 8

<RTA Process>

A conductive mayenite compound powder was synthesized under the same conditions as in Example 7 except that the RTA process was conducted at a process temperature of 1,000° C. instead of the RTA process temperature of 950° C. in Example 7. A conductive mayenite compound powder having a conduction electron concentration of $1.5\times10^{21}$ $cm^{-1}$ and a specific surface area of 14 $m^2g^{-1}$ was obtained.

The synthesis and treatment conditions of Examples 1 to 8 and Comparative Examples 1 and 2 are summarized in Table 1.

EXAMPLE 9

<Supporting of Ru on Conductive Mayenite Compound Powder>

In a Pyrex (registered trademark) glass tube, 1 g of the C12A7e⁻ powder prepared in Example 1, the powder having an amount of electron injection of $1.0\times10^{21}$ $cm^{-3}$ and a specific surface area of 17 $m^2g^{-1}$, and 0.042 g of $Ru_3(CO)_{12}$ were put, and the glass tube was vacuum-sealed. The vacuum-sealed tube was subjected to a heat treatment while rotating in an electric furnace using the following program.

[40° C., increasing temperature for 20 min.→40° C., holding for 60 min.→70° C., increasing temperature for 120 min.→70° C., holding for 60 min.→120° C., increasing temperature for 120 min.→120° C., holding for 60 min.→250° C., increasing temperature for 150 min.→250° C., holding for 120 min.]

Subsequently, the vacuum-sealed tube was broken, and the resulting powder was heat-treated in a hydrogen gas (26.7 kPa) atmosphere by increasing the temperature to 300° C. over a period of 5 hours and holding the temperature for two hours. Thus, a conductive mayenite compound powder supporting 2% by weight of Ru was obtained.

<Ammonia Synthesis Reaction>

A reaction in which nitrogen gas ($N_2$) and hydrogen gas ($H_2$) were allowed to react with each other to produce ammonia gas ($NH_3$) was conducted. The reaction was conducted in a fixed-bed flow-type reactor to which a quartz glass tube filled with 0.2 g of the prepared catalyst was attached. Regarding the flow rates of the gases, the flow rate of $N_2$ was set to 15 $mLmin^{-1}$, the flow rate of $H_2$ was set to 45 $mLmin^{-1}$, and the total flow rate was set to 60 $mLmin^{-1}$. The reaction was conducted at a pressure of atmospheric pressure and at a reaction temperature in the range of 320° C. to 400° C. A gas discharged from the flow-type reactor was bubbled in a 0.005 M aqueous sulfuric acid solution so that the produced ammonia was dissolved in the solution. The produced ammonium ions were quantitatively determined by ion chromatography. The production rate of ammonia at 340° C. was 2,388 $\mu molg^{-1}h^{-1}$.

TABLE 1

| | Method for synthesizing raw material | Pretreatment of raw material | Reducing agent | Reducing condition | RTA process |
|---|---|---|---|---|---|
| Example 1 | Hydrothermal synthesis | Evacuation, 900° C. | $CaH_2$ | 700° C. | Not performed |
| Example 2 | Hydrothermal synthesis | Evacuation, 800° C. | $CaH_2$ | 600° C. | Not performed |
| Example 3 | Hydrothermal synthesis | Evacuation, 900° C. | $CaH_2$ | 600° C. | Not performed |
| Example 4 | Hydrothermal synthesis | Evacuation, 800° C. | $CaH_2$ | 700° C. | Not performed |
| Example 5 | Hydrothermal synthesis | Evacuation, 800° C. | $CaH_2$ | 800° C. | Not performed |
| Example 6 | Hydrothermal synthesis | Evacuation, 1,000° C. | $CaH_2$ | 700° C. | Not performed |
| Example 7 | Hydrothermal synthesis | Evacuation, 800° C. | Ca | 700° C. | 950° C. |
| Example 8 | Hydrothermal synthesis | Evacuation, 800° C. | Ca | 700° C. | 1,000° C. |
| Comparative Example 1 | Solid-phase method | Evacuation, 1,100° C. | Ca | 1,100° C. | Not performed |
| Comparative Example 2 | Hydrothermal synthesis | Not performed | None | None | Not performed |

COMPARATIVE EXAMPLE 3

A 2wt % Ru-supported catalyst was prepared by the same method as in Example 9 except that the C12A7e$^{21}$ powder prepared in Comparative Example 1, the powder having an amount of electron injection of $2.0 \times 10^{21}$ cm$^{-3}$ and a specific surface area of 1 m$^2$g$^{-1}$, was used. The ammonia synthesis reaction was conducted as in Example 9. The production rate of ammonia at 340° C. was 1,229 µmolg$^{-1}$h$^{-1}$.

EXAMPLE 10

A 2wt % Ru-supported catalyst was prepared by the same method as in Example 9 except that the conductive mayenite compound powder prepared in Example 2, the powder having a specific surface area of 31 m$^2$g$^{-1}$, was used. The ammonia synthesis reaction was conducted as in Example 9. The production rate of ammonia at 340° C. was 1,575 µmolg$^{-1}$h$^{-1}$.

EXAMPLE 11

A 2wt % Ru-supported catalyst was prepared by the same method as in Example 9 except that the conductive mayenite compound powder prepared in Example 3, the powder having a specific surface area of 20 m$^2$g$^{-1}$, was used. The ammonia synthesis reaction was conducted as in Example 9. The production rate of ammonia at 340° C. was 1,831 µmolg$^{-1}$h$^{-1}$.

EXAMPLE 12

A 2wt % Ru-supported catalyst was prepared by the same method as in Example 9 except that the conductive mayenite compound powder prepared in Example 4, the powder having a specific surface area of 23 m$^2$g$^{-1}$, was used. The ammonia synthesis reaction was conducted as in Example 9. The production rate of ammonia at 340° C. was 1,696 µmolg$^{-1}$h$^{-1}$.

EXAMPLE 13

A 2wt % Ru-supported catalyst was prepared by the same method as in Example 9 except that the conductive mayenite compound powder prepared in Example 5, the powder having a specific surface area of 10 m$^2$g$^{-1}$, was used. The ammonia synthesis reaction was conducted as in Example 9. The production rate of ammonia at 340° C. was 1,793 µmolg$^{-1}$h$^{-1}$.

COMPARATIVE EXAMPLE 4

A 2wt % Ru-supported catalyst was prepared by the same method as in Example 9 except that the mayenite compound powder prepared in Comparative Example 2, the powder having a specific surface area of 60 m$^2$g$^{-1}$, was used. The ammonia synthesis experiment was conducted as in Example 9. The production rate of ammonia at 340° C. was 895 µmolg$^{-1}$h$^{-1}$.

The results of Examples 9 to 13 and Comparative Examples 3 and 4 are summarized in Table 2.

TABLE 2

| | Support used | Production rate of NH$_3$ (µmolg$^{-1}$h$^{-1}$) |
| --- | --- | --- |
| Example 9 | Example 1 | 2,388 |
| Example 10 | Example 2 | 1,575 |
| Example 11 | Example 3 | 1,831 |
| Example 12 | Example 4 | 1,696 |
| Example 13 | Example 5 | 1,793 |
| Comparative Example 3 | Comparative Example 1 | 1,229 |
| Comparative Example 4 | Comparative Example 2 | 895 |

INDUSTRIAL APPLICABILITY

The conductive mayenite compound having a large specific surface area and produced by the method of the present invention can be used as electronic materials such as a transparent electrode and a cold emitter that have good electronic properties. Furthermore, the conductive mayenite compound of the present invention can be used as high-performance reducing agents, catalyst materials, etc.

The invention claimed is:

1. A mayenite compound having a conduction electron concentration of 10$^{15}$ cm$^{-3}$ or more and a specific surface area of 5 m$^2$g$^{-1}$ or more.

2. The mayenite compound according to claim 1, wherein the mayenite compound is used as a support of a transition metal catalyst.

3. The mayenite compound according to claim 1, wherein the mayenite compound is in powder form.

4. The mayenite compound according to claim 1, wherein the mayenite compound is in a cage skeleton form.

5. The mayenite compound according to claim 1, wherein the mayenite compound is activated.

6. A supported metal catalyst comprising:
   a support comprising a conductive mayenite compound of claim 1; and
   a transition metal catalyst supported on the conductive mayenite compound support.

7. A method of synthesizing ammonia, the method comprising:
   providing a transition metal catalyst supported on the mayenite compound according to claim 1;
   supplying nitrogen gas (N$_2$) and hydrogen gas (H$_2$) to contact with the transition metal catalyst so as to react with each other to produce ammonia gas (NH$_3$).

8. The mayenite compound according to claim 1, wherein the mayenite compound is a conductive mayenite compound.

9. The mayenite compound according to claim 1, wherein the mayenite compound has a specific surface area of 6 m$^2$g$^{-1}$ or more.

10. The mayenite compound according to claim 1, wherein the mayenite compound has a specific surface area of 10 m$^2$g$^{-1}$ or more.

* * * * *